Figure 1:
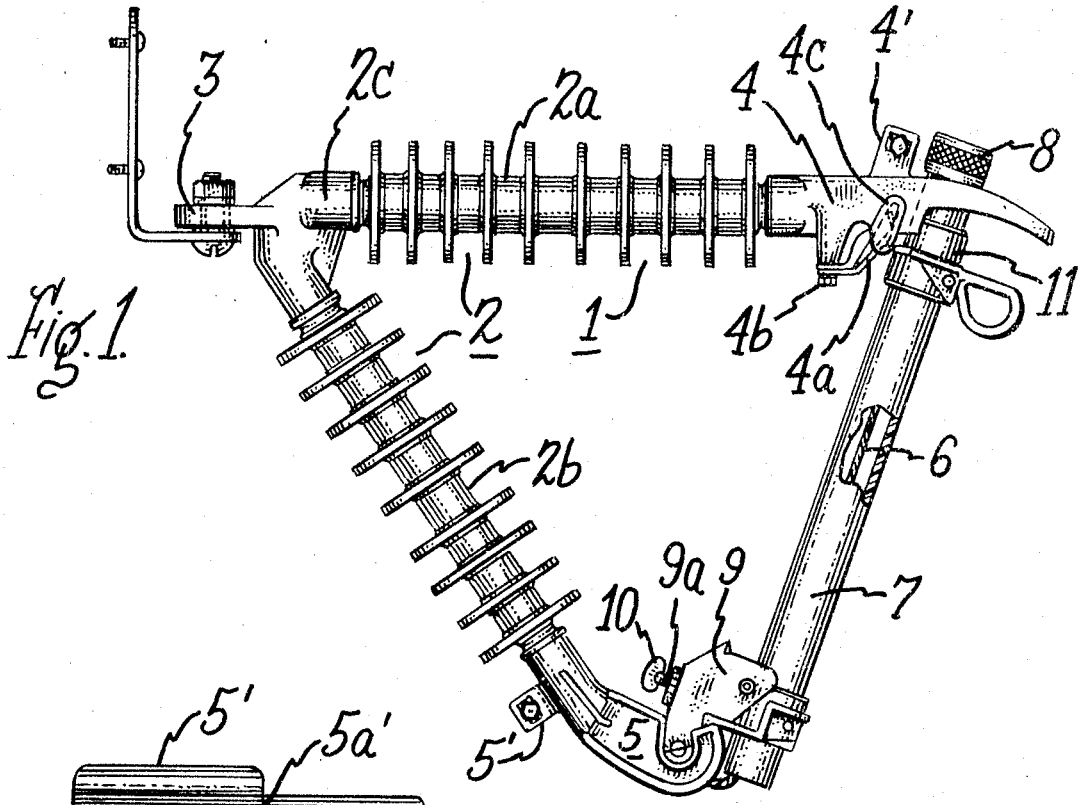
Figure 2:
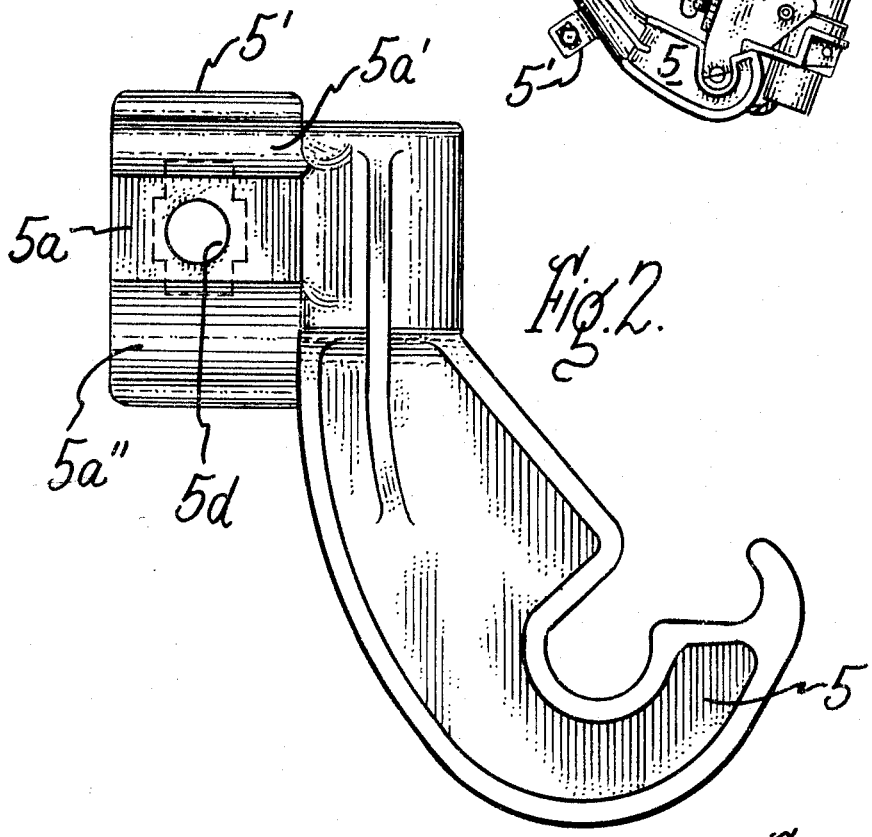
Figure 3:
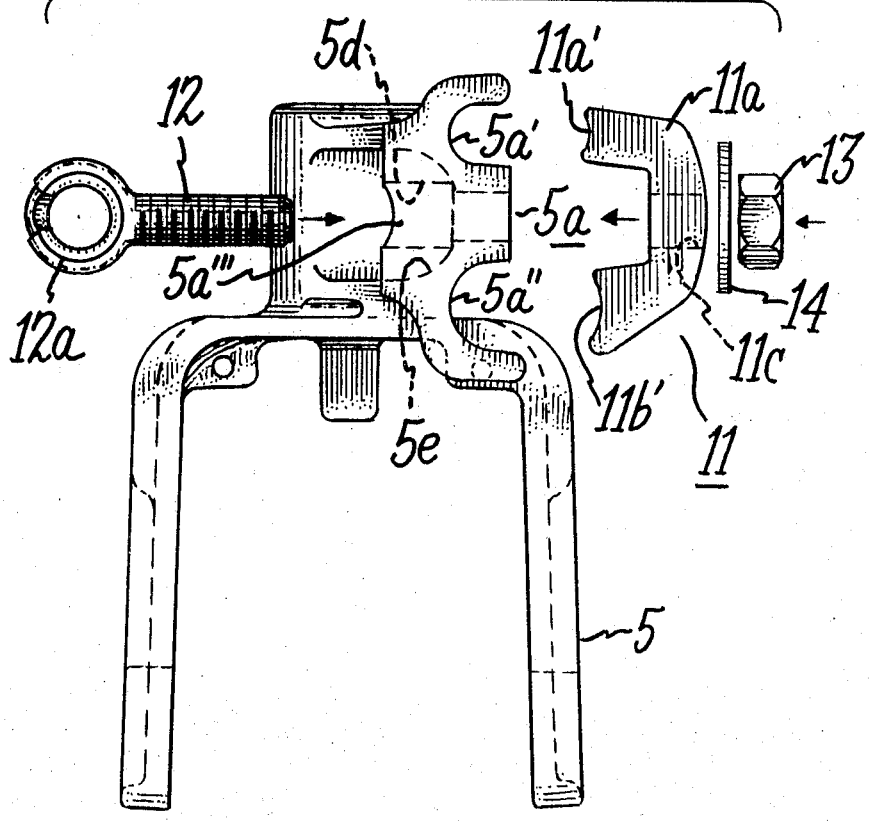
Figure 4:
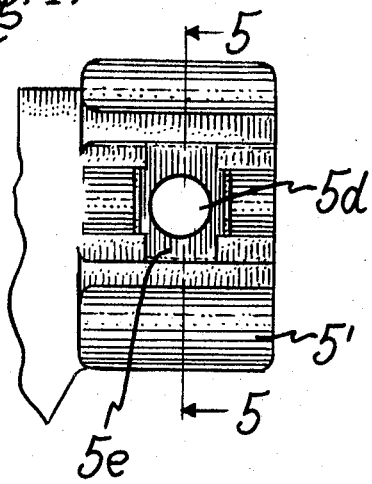
Figure 5:
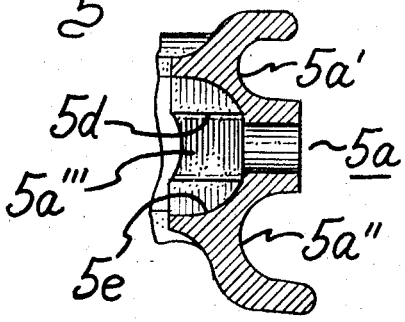

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 1, 1974

927 O.G. 7

T927,002

HIGH VOLTAGE ELECTRICAL SWITCH WITH INTEGRAL CONTACT AND CLAMPING MEANS

Edward A. Vrabel, Pittsfield, Mass., assignor to General Electric Company

Continuation of abandoned application Ser. No. 144,750, May 19, 1971. This application June 11, 1973, Ser. No. 368,731

Int. Cl. H01h *31/00*

U.S. Cl. 200—48 R

2 Sheets Drawing. 12 Pages Specification

An electrical switch of a type suitable for use as an open fuse cutout is provided with a pair of fixed contacts of a metal, such as aluminum alloy, mounted at opposite ends of a pivotally mounted switch blade, or rigidly supported fuse link, that is adapted to be pivoted on one of the fixed contacts and moved into engagement with the other fixed contact. The contacts mounted on opposite ends of the elongated insulating member are characterized by having integrally formed therewith elec-

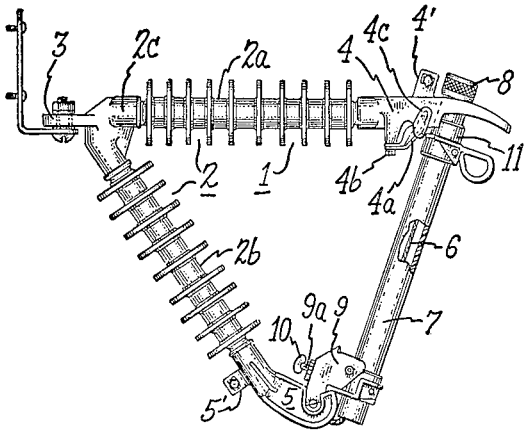

trical line terminals that are adapted to cooperate with a clamping means to secure a power line conductor to each of said line terminals. By forming the line terminals integrally with the contacts, the risk of galvanic corrosion between these respective elements is substantially diminished relative to prior art contact and line-terminal assemblies.

Oct. 1, 1974 E. A. VRABEL T927,002

HIGH VOLTAGE ELECTRICAL SWITCH WITH INTEGRAL CONTACT AND CLAMPING MEANS

Original Filed May 19, 1971 2 Sheets-Sheet 1

Inventor,
Edward A. Vrabel,
by Vale P Myles
His Attorney.

Inventor,
Edward A. Vrabel,
by Vale P Myles
His Attorney.